United States Patent [19]

Miller

[11] Patent Number: 5,028,217
[45] Date of Patent: Jul. 2, 1991

[54] APPARATUS FOR CONVERTING ROTATIONAL MOVEMENT INTO RECIPROCATING LIFTING MOVEMENT

[76] Inventor: Franz-Georg Miller, August-Lämmle-Weg 10, D-7250 Leonberg, Fed. Rep. of Germany

[21] Appl. No.: 576,406

[22] PCT Filed: Apr. 12, 1989

[86] PCT No.: PCT/DE89/00215
§ 371 Date: Aug. 31, 1990
§ 102(e) Date: Aug. 31, 1990

[87] PCT Pub. No.: WO89/09897
PCT Pub. Date: Oct. 19, 1989

[30] Foreign Application Priority Data

Apr. 13, 1988 [DE] Fed. Rep. of Germany ....... 3812231
Feb. 7, 1989 [DE] Fed. Rep. of Germany ....... 3903546

[51] Int. Cl.⁵ .................. F04B 35/04; F01B 3/08; F16H 29/02
[52] U.S. Cl. .................... 417/415; 92/33; 74/89.15
[58] Field of Search ............ 417/415, 437, 519; 74/89.15, 424.8 R; 92/33, 31

[56] References Cited

U.S. PATENT DOCUMENTS 2,246,733  6/1941  Kiefer .................... 74/57
2,321,828  6/1943  Lane ..................... 417/415
4,417,860  11/1983  Justice ................. 417/415
4,603,616  8/1986  Zajac .................... 92/33

Primary Examiner—Leonard E. Smith
Assistant Examiner—Charles G. Freay, Jr.
Attorney, Agent, or Firm—Michael J. Striker

[57] ABSTRACT

An apparatus for converting rotational movement into reciprocating lifting movement or vice versa, compriss a bearing body that incorporates a first, cylindrical wall section with first guide grooves, a rotary element that is supported on the bearing body so as to be able to rotate and that incorporates a second cylindrical wall section with second guide grooves that are arranged at an angle to the first guide grooves, a lifting element that is supported on the bearing body so as to move back and forth and that incorporates a third wall section, in which continuous bearing drillings with axes that are transverse to the lifting movement are arranged, and a force transfer system with driver balls that are guided within the bearing drillings. In each bearing drilling there are two driver balls that lie one behind the other in the axial direction and which rest against each other. One such driver ball is supported in part in the first guide groove and the other is supported in part in the second guide groove.

17 Claims, 6 Drawing Sheets

5,028,217

APPARATUS FOR CONVERTING ROTATIONAL MOVEMENT INTO RECIPROCATING LIFTING MOVEMENT

BACKGROUND OF THE INVENTION

The present invention relates to an apparatus for converting a rotational movement into a reciprocating lifting movement or vice versa.

A known apparatus of this kind (U.S. Pat. No. 2,246,733) can be used for controlling valves, robots, machien tools, or the like, and so as to avoid having to use crank-type drives in conjunction with pumps, internal-combustion engines, and the like. In these drives, each force-transfer system consists of individual drive balls that are arranged in part within the bearing drilling and are supported in part in the first and second guide grooves. For this reason, either the wall sections taht incorporate the bearing drillings must be comparatively thin or the diameter of the driver balls must be comparatively large in order that said drive balls can protrude to a sufficient depth into the first and second guide grooves, which leads to unfavourable mechanical/design conditions. Above all, however, because of the fact that the driver balls interact with both guide grooves by sliding friction, an apparatus of this kind is of only limited use and is distinguished by large frictional forces and a high degree of wear.

SUMMARY OF THE INVENTION

It is an object of the present invention to improve the apparatus described such that more favourable mechanical/design conditions result an that during operation there is a considerable reduction of frictional forces and wear.

According to the present invention there is provided an apparatus for converting rotational movement into reciprocating lifting movement or vice versa, comprising a bearing body incorporating a first, cylindrical wall section with first guide grooves that extend in the direction of the lifting movement; a rotary element supported on the bearing body so as to be able to rotate and incorporating a second cylindrical wall section with second guide grooves that are arranged at an angle to the first guide grooves; a lifting element that is supported on the bearing body so as to move back and forth and which incorporates a third wall section that protrudes between the first and the second wall sections, in which continuous bearing drillings with axes that are transverse to the lifting movement are arranged; and a force transfer system with driver balls that are guided within the bearing drillings and supported in part in the first and second guide grooves, wherein in each bearing drilling there are two driver balls that lie one behind the other in the axial direction and which rest against each other, one such driver ball being supported in part in the first guide groove and the other being supported in part in the second guide groove.

The present invention has the important advantage that even the replacement of each driver ball by a pair of driver balls has a considerable effect on the force-transfer process. Since the two driver balls are loaded in opposite directions of rotation during operation, they can roll both in the guide grooves and at their contact points without any significant wear. However, should a slight amount of wear take place because of directions of rotation that are not precisely antiparallel, this can be accepted because the point contact of the driver balls is always on various parts of the ball surfaces as a result of their constant rotation and for this reason cannot lead to a single point of wear on the surface of the driver ball. Finally, a particular advantage lies in the fact that the force components exerted parallel to the axis of the bearing drilling onto the driver balls during the transfer of force can be largely balanced out and for this reason is not transferred to the lifting element, which means that the forces that have to be used to move the lifting element and the rotating element are slight.

In accordance with another feature of the present invention, the drive balls can rest at least when in operation in a central part of the bearing drilling.

In the bearing boring, between the two driver balls, an even number of transmission mechanisms lying one behind the other can be formed from additional balls and provide mutual support for the driver balls.

Each transmission mechanism can consist of a transmission ball, all the transmission balls being arranged one behind the other in the axial direction and between the driver balls. The driver and the transmission balls, at least during operation of the force-transfer system, are in mutual contact.

Two transmission mechanisms can be provided, each consisting of a ring made up of a plurality of transmission balls that support one of the driver balls. The transmission balls of both rings can be in mutual contact at least during operation.

The driver balls can be supported in the bearing drilling by a supporting mechanism consisting of supporting balls.

A guide sleeve for accommodating the driver, supporting and/or transmission balls can be inserted into the bearing drilling.

The lifting element and the bearing body can incorporate additional guide grooves that extend in the direction of the lifting movement and support additional guide balls.

The third wall section can surround the second wall section and the first wall section can surround the third wall section.

The lifting element can incorporate a plunger that is guided and sealed within a closed chamber, and the chamber can have a wall that incorporates at least one port.

The first and the second wall sections, the plunger, the bearing body and the rotary element can define a closed chamber and the first wall section can incorporate at least one port.

The apparatus can be formed as a pump with a wall which incorporates at least one inlet and one outlet port and the rotary element can be coupled with a controller plate associated with the wall. The controller plate can incoporate covers or ports, respectively, that either cover or uncover the inlet and the outlet openings as desired.

The novel features which are considered as characteristic for the invention are set forth in particular in the appended calims. The invention itself, however, both as to its construction and its method of operation, together with additional objects and advantages thereof, will be best understood from the following description of specific embodiments when read in connection with the accompanying drawings.

DESCRIPTION OF THE PREFERRED EMBODIMENTS

Figure 1:
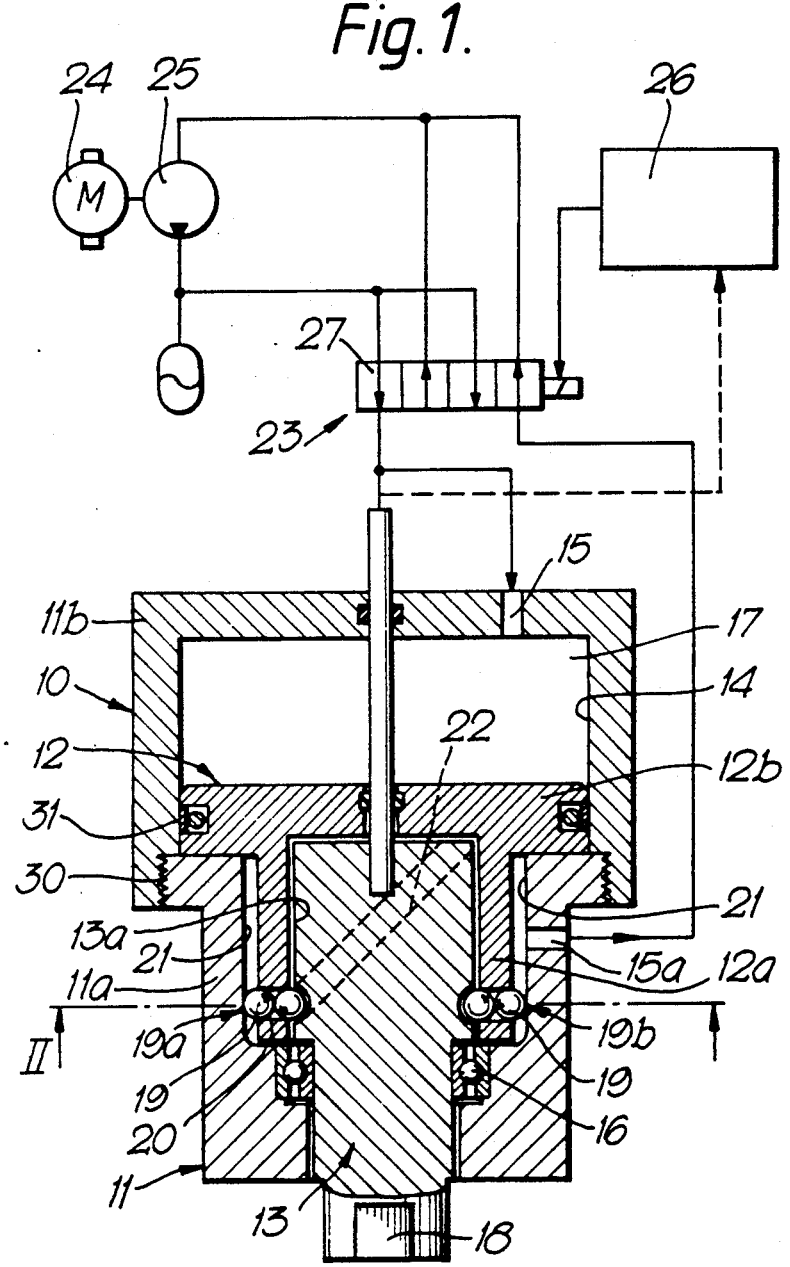
FIG. 1 is a diagrammatic longitudinal cross-section through a first embodiment of the apparatus according to the present invention.
Figure 2:
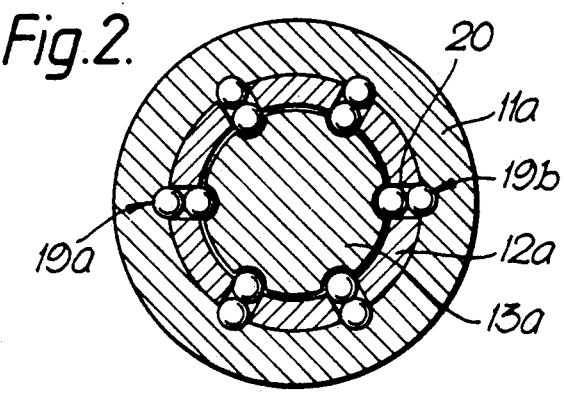
FIG. 2 is a cross-section taken on the line II—II in FIG. 1.

FIGS. 1 and 2 show an apparatus 10 for converting a reciprocating rotational movement into a reciprocating linear lifting movement and vice versa. The apparatus 10 incorporates a bearing body 11 with a first, cylindrical wall section 11a, on the inner surface of which is formed a guide groove 21 that extends in the direction of the lifting movement and is preferably parallel to the axis thereof. In addition, the apparatus 10 incorporates the rotary element 13 with a second externally cylindrical wall section 13a that extends, at least in part, into the first wall section 11a, is coaxial to this, and incorporates on its outside peripheral surface at least one helical guide groove 22 that extends at an angle, preferably of 45, to the guide groove 21. The rotary element 13 is supported by means of any sort of rotary bearing 16 (for example, a ball bearing) so as to be able to rotate but not move axially within the bearing body 11.

In addition, the apparatus 10 incorporates a lifting element 12 with a third wall section 12a that is preferably in the form of a hollow cylinder, extends coaxially into the space between the first and the second wall section 11a or 13a, respectively, and can be moved axially back and forth within this space. At least one bearing drilling 20 that passes through it completely is incorporated in this third wall section 12a, and the axis of this drilling extends transversely to the direction of the lifting movement, preferably perpendicular to this.

Finally, the apparatus 10 incorporates a force-transfer system by means of which the force that is exerted on the lifting element 12 is transferred to the rotary element 13 so as to cause this to move in a corresponding rotary motion. At one unattached end of the rotary element 13 there is a coupling 18 that serves for connection to a rotating object or to a rotary motor or the like.

According to the present invention, the force-transfer system consists of pairs 19a, 19b of driver balls 19 that rest against each other. The balls 19 of each pair 19a, 19b are arranged so as to lie one behind the other in an associated bearing drilling 20, where they rest against each other. In FIG. 1, in each pair, one of the balls protrudes outward from the associated bearing drilling 20 and into guide groove 21 that is associated therewith, whereas the other of the two balls 19 shown in FIG. 1 extends inward from the bearing drilling 20 and into a guide groove 22 that is associated therewith.

The arrangement as in the example in FIG. 1 is so selected that the length and the diameter of each bearing drilling 20 are essentially equal to the diameter of each of the driver balls 19 and one half of each ball 19 protrudes from the bearing drilling 20 and into the associated guide groove 21 or 22, respectively. The guide grooves 21, 22 are thus preferably semi-cylindrical or of semi-circular cross-section, respectively, and are of a radius that corresponds to the diameter of the balls. The interval between the deepest points of the two guide grooves 21, 22 from each other corresponds to the sum of the two ball diameters, both driver balls 19 preferably being of the same diameter.

It is, of course, understood that the force-transfer system that is intended to convert a linear lifting movement of the lifting element 12 into a rotational movement of the rotary element 13 or vice versa requires only a single pair 19a or 19b of driver balls 19. However, in principle, it is advantageous to incorporate a plurality of such pairs 19a, 19b so as to distribute the forces that occur onto a plurality of pairs 19a, 19b that are spaced equidistantly along the periphery of the wall section 12 and, at the same time, provide for the almost frictionless centering of the wall section 13a in the wall section 12a or the wall section 12a in the wall section 11a, respectively. This also ensures that the wall section 12a is supported on the wall section 11 so as to be unable to rotate. Since the principle configuration of method of operation of the apparatus described above is known (U.S. Pat No. 2,246,733), all that is required here is to describe the differences that are achieved by the present invention.

If a force is exerted on the element 12 in the direction of the lifting movement (for example, upwards, in FIG. 1), the outer driver balls 19 will roll within the guide grooves 21 as indicated by the arrows. In contrast thereto, the inner driver balls 19 roll in the inclined guide grooves 22. Since the guide grooves 22 are so arranged as to be inclined relative to the guide grooves 21, the driver balls 19 that are rolling in it possess a considerable movement component that acts in the direction indicated by the arrow, and in each instance this is directly opposed to the direction of rotation of the other driver ball 19 of the pair. This means that where they touch each other in the centre portion of the bearing drilling 20, the driver balls can to a large extent roll on each other. Slight wearing movements are, of course, possible. However, they play an insignificant role because of the point contact between the driver balls 19. Since during ordinary movement of the apparatus 10 the point contact changes constantly to other points on the surface of the ball because of the back and forth movements of the balls, there is no risk of permanent stress or loading of a selected point on the surface of the ball. For this reason, the apparatus 10 works with very little friction and wear.

With regard to the distribution of force, there is the further advantage that only very few forces are transferred from the driver balls of each pair 19a, 19b to the lifting element 12. Those forces, that attempt to force the driver balls 19 from the guide grooves 21, 22 during normal movement of the apparatus 10 are largely parallel to the axes of the bearing drillings 20 and are mostly balanced out by the mutual support of the driver balls 19. For this reason, the forces that act on the lifting element 12 remain confined to the small zone in which the driver balls lie on the inner wall of the bearing drilling 20. Since there is essentially linear contact in the area of this zone, the forces or friction caused by it are similarly small. For this reason only small forces are needed to move the lifting element 12 or the rotary element 13, respectively, back and forth. Naturally, the same favourable conditions result if the rotary element 13 is driven positively so as to convert its rotational movement into a linear, reciprocating movement of the lifting element 12.

In the apparatus 10 shown in FIG. 1, the housing 11 has an additional wall section 11b that is connected coaxially and, for example, by means of a screw connection 30, with the wall section 11a. Thus, the wall section 11b, the inner surface of which can be configured as desired, but which is preferably cylindrical, serves to form a closed chamber 17 that lies on the outer side of a preferably cylindrical plunger 12b that is arranged as an extension of the wall section 12a, and forms a cylinder within which the plunger 12b with the wall section 12, which serves as a plunger connecting rod, can be moved back and forth. A peripheral seal 31 serves to seal the plunger 12b against the inner surface 14 of the chamber 17.

A second closed chamber is formed by the wall section 11a, the wall section 13, the side of the plunger 12b that faces these two wall sections, and, optionally, further parts of the bearing body 11 or of the rotary element 13, so that in total a cylinder/plunger arrangement results.

As an example, a pneumatic or hydraulic system 23, which incorporates a drive motor 24, a pump 25 driven by this, an electrical or electronic control system 26, and an electrically operated valve 27, serves to generate the lifting movement. The dead-point position of the piston is reached in that a fluid is introduced from the pump 25 through a port 15 into the chamber 17 and simultaneously the fluid in the other chamber is returned through an opening 15a in the wall section 11a to the pump 25. During the production of the other dead-point position, which cannot be seen from FIG. 1, the flow of fluid takes place in the opposite direction. Depending of the direction of movement of the lifting element 12, the rotary element 13 is rotated in one or the other direction, since the pairs 19a,b of driver balls 19 move back and forth in the first guide grooves 21 and because of their engagement in the second guide grooves 22 they move the rotary element 13 with them.

Figure 3:
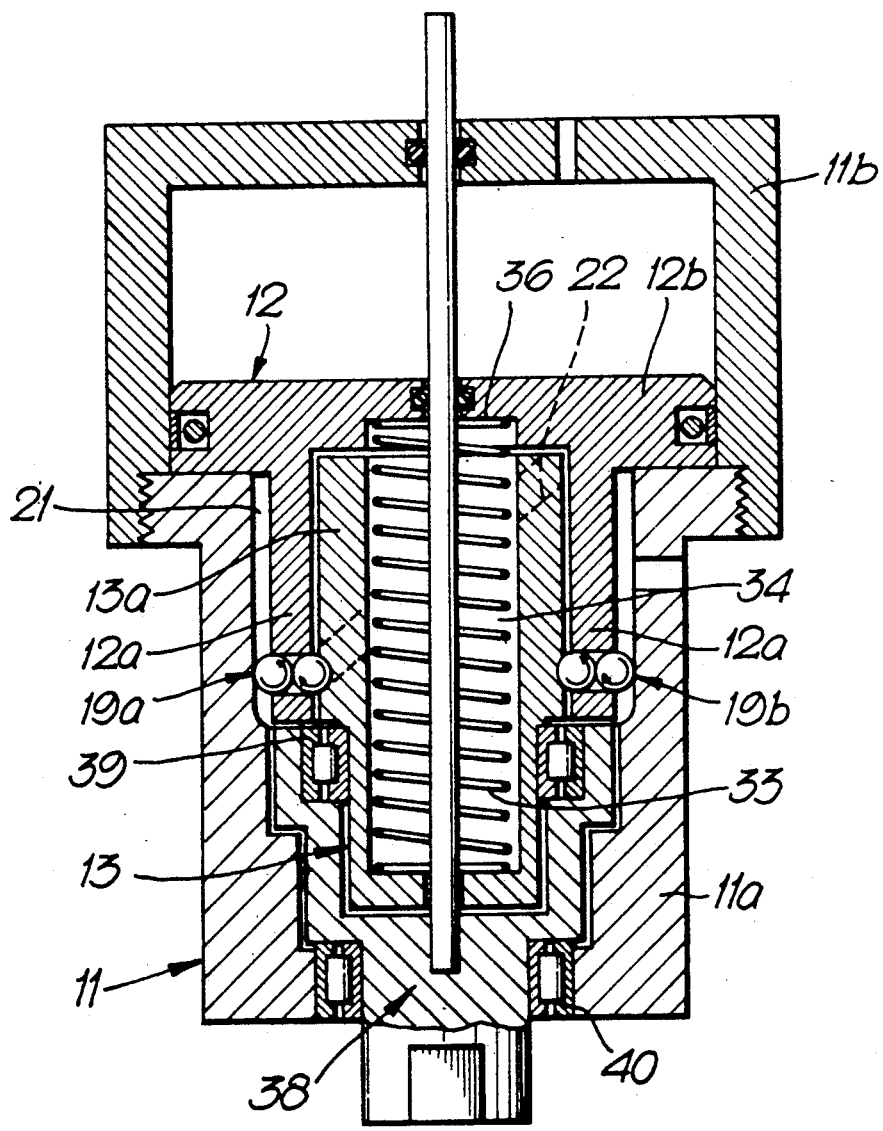
FIGS. 3 and 4 are diagrammatic cross-sections through two additional embodiments of the apparatus according to the present invention.

In the embodiment shown in FIG. 3, in which the same parts bear the same reference numbers, an energy accumulator 32 in the form of a restoring spring is provided to return the plunger 12b into one dead-point position. This is installed in a recess 34 of the rotary element 13 that is open towards the plunger 12b and rests at one end on the base of this recess 34 and at the other on an axial bearing 36 that is secured to the plunger 12b. After production of the dead-point position that can be seen in FIG. 3 by means of the system 23 as in FIG. 1, the plunger 12b can move back into the other dead-point position under the action of the return spring 33.

In addition, the embodiment shown in FIG. 3 is characterized in that the lifting movement is converted into a rotational movement that only takes place in one direction. To this end, the rotary element 13 is installed on a hollow shaft 38 which, like the wall section 12a, protrudes partly into the space between the first wall section 11a and the second wall section 13a and is supported at one end by pivot bearings 39, 40 at one end so as to be able to rotate on the rotary element 13 and at the other so as to be able to rotate on the bearing body 11. Both pivot bearings 39, 40 are figured as free-wheeling devices or are fitted with reverse lock-outs, so that the shaft 38 can only be rotated intermittently in one direction. This rotation is effected, for example, if the plunger 12b is moved into the dead-point position that can be seen in FIG. 3. During the opposite movement of the lifting element 12, the rotary element 13 can once again be rotated back, whereas the return rotation of the shaft 38 is blocked by the reverse lock-out system. The apparatus as in FIG. 3 thus functions as a type of stepper motor or an intermittent drive.

Figure 4:
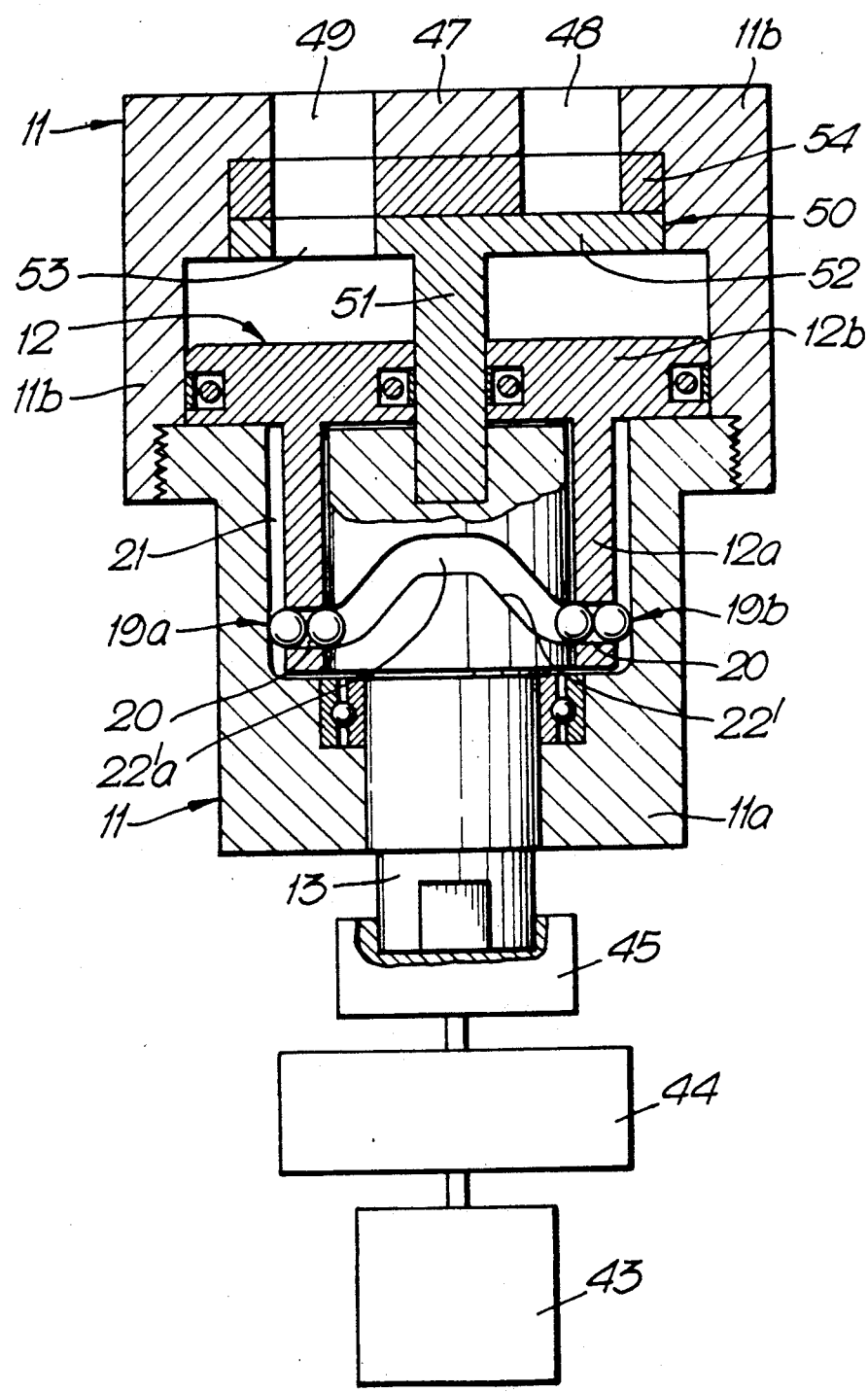
Figure 5:
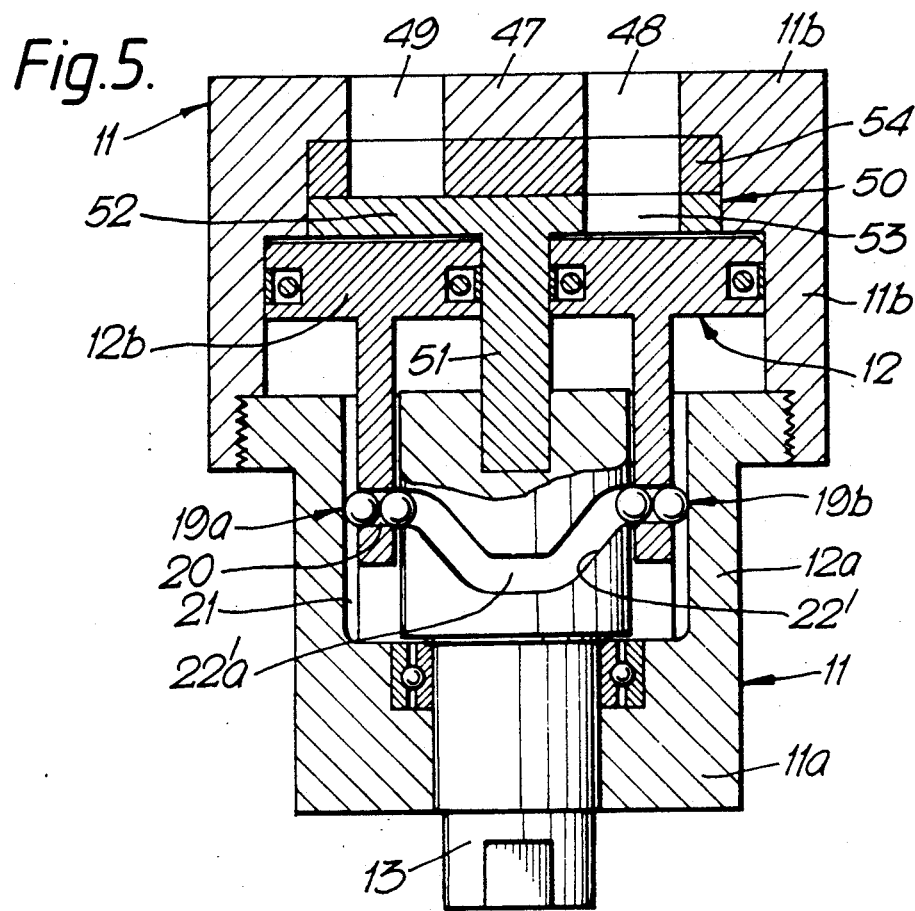
FIG. 5 shows the embodiment of FIG. 4 in another lift position.

In the embodiment shown in FIGS. 4 and 5, in which once again the same parts bear the same reference numbers, the rotary element 13 incorporates a guide groove 22'. As can be seen from the unsectioned diagram of the rotary element 13, the guide groove 22' has an ascending and a descending rotary element 13 there is an ascending and a descending section all the sections flowing smoothly from one to the other.

If the rotary element 13 is rotated continuously in one direction by means of a motor 43 that is connected preferably through a controllable gear system 44 by means of a coupling 45, then this rotary movement is converted into a reciprocating movement of the lifting element 12 and the plunger 12b with the help of the guide grooves 22', the pairs 19a, 19b of driver balls 19 and the guide grooves 21. In this embodiment, the plunger 12b is moved back and forth twice per rotation of the rotary part 13.

In an end wall 47 of the bearing body that is parallel to the surface of the plunger 12b there is at least one inlet opening 48 and at least one outlet opening 49. Opposite these, on the inner side of the end wall 47, there is a controller plate 50, which is preferably of ceramic material, that is closely adjacent to the end wall 47 and secured to the rotary element 13 by a cylindrical rod 51 that passes, sealed, through the plunger 12b. The controller plate 50 incorporates two covering sections 52 and two ports 53, and these can be aligned with the ports 48, 49 by rotating the controller plate 50. The sections 52 and the ports 53 are so arranged relative to the ascending and the descending sections of the guide groove 22' that when the plunger 12b is moved into the dead-point position that can be seen in FIG. 5, the inlet opening 48 is covered and the outlet opening 49 is aligned with the port 53 (position as in FIG. 4). In contrast thereto, during the reverse movement of the lifting element, the outlet opening 49 is covered and the outlet opening 49 is lined up with the port 53 (position as in FIG. 5). This means that a pumping action can be achieved by very simple means, in that the inlet opening 48 is connected to the chamber containing the medium that is to be delivered and the outlet 49 is connected to the chamber that is to accommodate the medium. The opening and closing intervals can be selected by selecting suitable dimensions for the various sections of the guide groove 22, In addition, the guide groove 22' can incorporate horizontal sections 22'a (FIG. 4) that serve to keep the lifting element 12 stationary despite the rotation of the rotary element 13 and the controller plate 50, and thus prepare for the opening and the closing of the inlet and outlet openings 48, 49. It is expedient that a sealing disk or washer 54 that is also of ceramic material or the like and which bears the same porting layout be installed between the controller plate 50 and the wall 47.

In principle, the working sequence of the pump as in FIG. 4 consists of the induction, compression and expulsion phases, which can also be used in a kinematically reversed sequence in order to realize the basic principle of an active internal- combustion engine, e.g., and Otto or Diesel engine, when in place of the valve-control system that is shown, any other valve- control system can be used. Compared to known machinery with crank-type drive, such internal-combustion engine with a rotary- valve system entails the advantage that the transfer of force can be effected smoothly over the stroke and is not a function of the angular position of the crank. In addition, there is no direct relationship between the maximum torque that can be produced and the piston travel, so that it is possible to achieve a greater amount of torque for a given installed size. For this reason, given appropriate modification, the apparatus as in FIG. 4 can be used to replace the crankshaft principle in a number of applications. A plurality of the apparatus described herein can work with their rotary elements 13 on common gear wheels and be combined to form a variety of plunger/cylinder arrangements in a small space. Such aggregate systems can be used in two-cycle and four-cycle motors.

Figure 6:
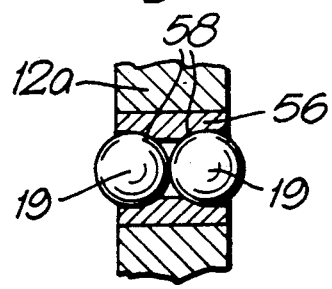
FIGS. 6 and 7 are sections through two embodiments that support a pair of driver balls in the apparatus according to the present invention.
Figure 7:
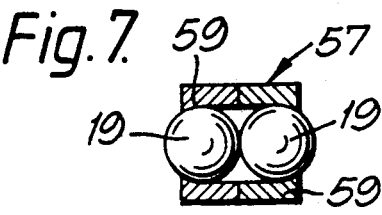

In order to install the driver balls 19 and, if needs be, other balls, it may be expedient to install these in bearing sleeves 56, 57, as is shown in FIGS. 6 and 7; these sleeves, which are preferably of hard metal, are then pressed into the bearing drillings 20 in the wall section 12a. These bearing sleeves 56, 57 can either incorporate circular, interior projections 58, as is shown in FIG. 6, or exterior projections 59, these serving as inner or outer contact surfaces in the manner of bearing shells for the driver balls 9. In FIG. 7, the bearing sleeve 57 consists preferably of two halves that adjoin in an axial direction and which can, in addition, be joined to each other by means of screws that have axes that are parallel.

In the case of high-speed rotating machinery, e.g., hydraulic motors, it may be desirable to reduce the wear that takes place between the driver balls 19 and the walls of the bearing drillings 20 by installing a supporting mechanism between the driver balls, this preventing direct contact of the driver balls on the walls of the bearing drilling 20. As an example, such a supporting mechanism consists, for example, of two rings 60 of supporting balls 62, the diameter of which is smaller than the diameter of the driver balls 19. The supporting balls 62 are supported in annular recesses 63 that are formed by enlargements of the cross-section at the ends of the bearing drillings 20, and are each supported on the walls of said bearing drillings by point contact. At the same time, the recesses 63 simplify assembly of the rings 60. The diameters of the recesses 63 and of the supporting balls 62 are so large in relation to the diameters of the driver balls 9 that although these are supported by point contact on the associated ring of supporting balls 62, they also pass in part through the ring so as to touch each other in a centre part of the bearing drilling 20. This is shown in FIG. 8.

The action of the driver balls 19, described heretofore, also occurs if said driver balls 19 are supported not directly on each other, but only indirectly through an even number of transmission mechanisms. In the simplest case, each transmission mechanism can consist of at least one transmission ball, so that between each two driver balls 19 there is an even number of transmission balls arranged one behind the other in the same bearing drilling 20. Since the number of transmission balls per bearing drilling 20 is an even number, adjacent balls will rotate in opposite directions at their point of contact, so that they will roll against each other without any significant amount of wear. In comparison to FIGS. 1 to 7, only the axial length of the bearing drillings 20 would have to be extended such that the outer or inner driver ball is supported in the desired manner, in part in the bearing drilling 20 and rolls in part in its associated guide groove 21 or 22, respectively.

Figure 8:
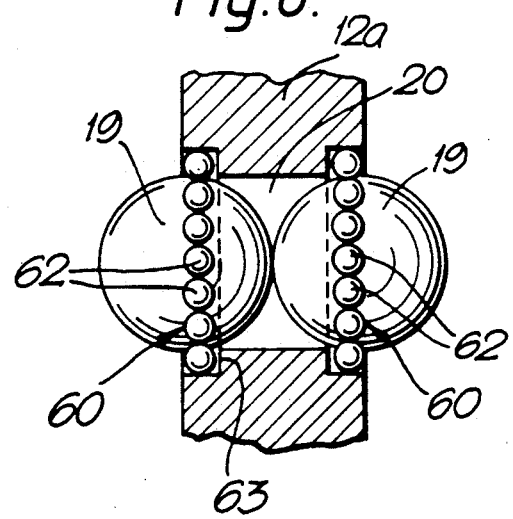
FIG. 8 is a cross-section through a third embodiment to support the driver balls.
Figure 9:
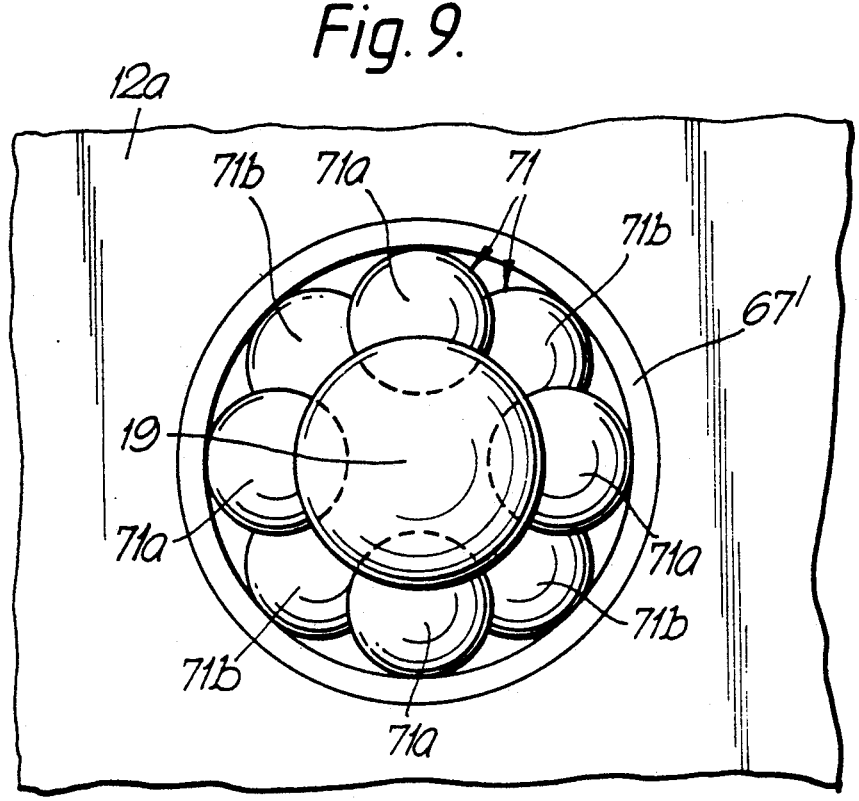
FIG. 9 is side view of an alternative embodiment of a force-transfer system for the apparatus according to the present invention.
Figure 10:
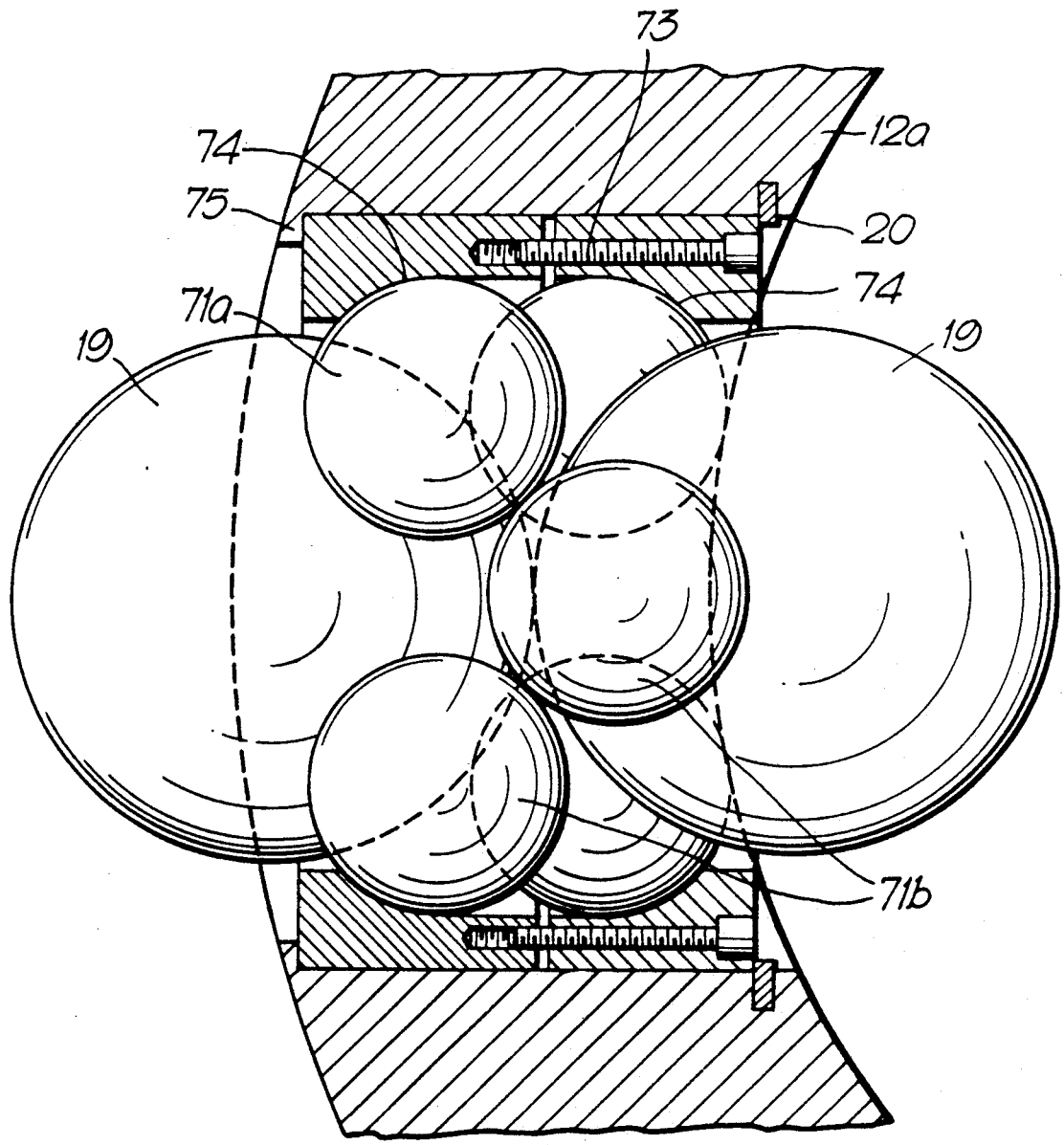
FIG. 10 is a section corresponding to FIG. 8, at greater scale, showing details of the force-transfer system.

As can be seen in FIGS. 9 and 10, in order to avoid pressure that is too high because of the point contact between the driver balls 19, each transmission mechanism be formed of a ring 71 of transmission balls 71a, 71b, each ring 71 being supported in the bearing drilling 20, analogously to FIG. 8. In contrast to FIG. 8, however, the transmission balls 71a of a ring 71 and the transmission balls 71b of the other ring 71 are in contact in a central area of the bearing drilling 20. For this reason, in this embodiment, the driver balls 19 need not rest against each-other or support each other directly. The desired mutual support is effect in this case directly through the ring 71. Since an even number of rings 71 is provided, all the balls 19, 71a, 71b that are involved can roll on each other or in the guide grooves 21, 22, as is desired.

As is shown in the enlarged cross-section in FIG. 10, the assembly of the rings 71 is effected preferably with the help of a two-part bearing sleeve 72 that is inserted into the bearing drilling 20; the two halves of this sleeve are joined rigidly to each other by means of a screw 73 and incorporate recesses 74, which are like bearing shells, to prevent the transmission balls 71a,b from dropping out. The bearing sleeve 72 can be fixed, for example, by means of an extension 75 and a spring retainer ring 76, within the bearing drilling 20. The number and size of the transmission balls 71a, b is to a very great extent a free choice. In the embodiment shown there are four transmission balls 71a or 71b, respectively, the diameter of which is smaller than the diameter of the driver balls 19. In FIG. 9, the transmission balls 71a, b are of such a size that a transmission ball 71a of one ring is supported between two transmission balls 71b of the other ring, or vice versa, without the transmission balls 71a or 71b, respectively, touching each other. In contrast thereto, each driver ball 19 touches four transmission balls 71a, b of the associated ring 71 and, as shown in FIG. 9, exerts a spreading force on the transmission balls 71a, b. These are thus pressed, in part radially, against the bearing sleeve 72 and in part against the transmission balls of the other ring 71 which support them. The distribution of force can be controlled in each instance by selection of the size and number of transmission balls.

Figure 11:
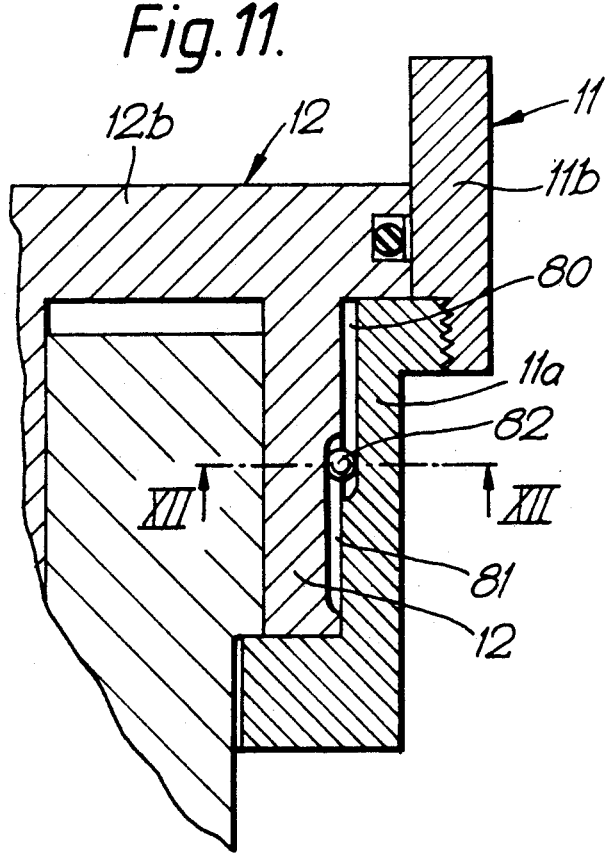
FIG. 11 is a diagrammatic, partial axial cross-section through the apparatus according to the present invention showing an additional guide ball.
Figure 12:
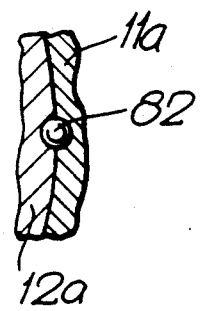
FIG. 12 is cross-section through the apparatus of FIG. 11 taken along the line XII—XII.

With regard to the adjustment of bearing play in the embodiments described herein, all that has to be ensured is that the distance between the guide grooves 21 and 22, measured from the bottoms of said grooves, is equal to or slightly larger than the sum of the diameter of the driver balls 19. This dimension can be made adjustable, for example, in that the guide grooves 21 are formed in wedge-shaped slides that can be displaced parallel to the guide grooves 21. Regardless of this, however, it has been shown that a small amount of play can be left between the various balls when they are idling. Providing this play is sufficiently small, in an apparatus is in use, the driver balls 19 do not roll precisely on the base of the groove, but along the side walls of the guide grooves 21, 22, so that in this case to, at least during operation, there will be the desired mutual support of the driver balls and/or the supporting and transmission balls. FIGS. 11 and 12 show that, in order to improve the guidance of the wall section 12a within the wall section 11a, there are additional guide grooves 80, 81 that are parallel to the lifting movement, and that there are additional guide balls 82 arranged in these grooves. By this means, the lifting element 12 is centred with very little friction and securely within the bearing body 11 and secured against tilting and uncontrolled rotation.

The present invention is not restricted to the embodiments described herein, which can be modified in numerous ways. This applies especially for the diameters of the driving, supporting, and transmission balls that are selected in each individual case, when even different diameters of the driver balls 19 per bearing drilling 20 would be possible with appropriate graduation. Neither is it essential that the driver balls 19 are in each instance arranged in exactly one-half in the bearing drillings 20 and in the associated guide grooves 21, 22. Here, various distributions can be selected depending on each individual case, insofar as the desired transfer of force is not prejudiced by so doing. The cross-sections and track shapes of the guide grooves 21, 22 can be selected as desired. In particular in regard to the embodiments shown in FIG. 4, the speed of movement of the lifting element 12 on the outward and the return travel can be controlled with the help of variously configured ascending and descending sections. In addition, if an additional rotational movement of the lifting element 12 is to be permitted or is desired, the outer guide grooves 21 can run in an inclined helical shape so as to permit stepping-up or stepping-down of the rotational movement thereby, in the manner of a differential gearing, relative to the lifting movement at a prescribed stroke. In addition, the formation of the transmission mechanisms that are provided as required can be selected as desired.

The service life of the apparatus according to the present invention is extraordinarily long. Using the embodiment shown in FIG. 1, which up to now has proved to be the most satisfactory, well over one million strokes were completed without any perceptible signs of wear or scoring on the guide grooves 21, 22, even through the three parts 11, 12, and 13 were all produced from economical plastic.

Furthermore, the present invention is not restricted to the relative positions of the parts 11, 12, and 13 that are shown in FIGS. 1 to 12. It would also be possible the replace the bearing body 11 and the rotary element 13 by each other so that the first wall section 11a was all inside, the second wall section 13a was all outside, and the third wall section 12a, as in FIG. 1, was between the two. In this case, though, the guide groove 22 would have to be formed on the inner side of the wall section 13a.

In addition to the foregoing, the present invention is not restricted to a specific number of alternating guide grooves and pairs 19a, b. As many guide grooves 21, 22 can be formed on the periphery of the wall sections 11a, 13a as is made possible by structural factors. In addition, several pairs 19a, b can be inserted parallel to the lifting movement in the available and, if neds be, suitably lengthened guide grooves 21 and 22. This means that the force transfer that is required can be distributed evenly onto a plurality of pairs 19a, b should a single pair of driver balls be insufficient for this purpose. It would also be possible to form several variously configured guide grooves 22 in the wall section 13a and make the arrangement such that the position of wall section 13a is adjustable relative to the wall section 12a. In this case, the pair of driver balls 19 could each be associated with a selected guide groove 22 by appropriate adjustment.

The apparatus described heretofore can be used in a variety of applications in particular as adjusting drives, pumps, compressors, motors, gear systems, traversing drives, movement convertors, or pickups for measured values for lifting or rotational movements.

What is claimed is:

1. An apparatus for converting rotational omvement into reciprocating lifting movement or vice versa, comprising a bearing body having a first cylindical wall section with first guide grooves that extend in the direction of a lifting movement; a rotary element supported on said bearing body so as to be ablet o rotate and having a second cylindrical wall section with second guide grooves that are arranged at an angle to said first guide grooves; a lifting element that is supported on said bearing body so as to move back and forth and having a third wall section that protrudes between said first and said second wall sections; continuous bearing drillings provided in said third wall section and having axes that are transverse to the lifting movement; a force transfer system with driver balls that are guided within said bearing drillings and supported in part in said first and second guide grooves; two driver balls lying in each of said bearing drillings one behind the other in an axial direction and resting against each other, one of said driver balls being supported in part in said first guide groove and the other of said drive balls being supported in part in said second guide groove.

2. An apparatus as defined in claim 1, wherein said bearing drilling has a central part, said driver balls resting in asid central part of said bearing drilling at least when in operation.

3. An apparatus as defined in claim 1; and further comprising an even number of transmission mechanisms lying one behind the other in said bearing drilling between two of said driver balls and formed by additional balls so as to provide mutual support for said driver balls.

4. An apparatus as defined in claim 3, wherein each of said transmission mechanisms includes one of said transmission balls, all said transmission balls being arranged one behind the other in an axial direction and between said driver balls, said driver balls and said transmission balls being in mutual contact at least during operation.

5. An apparatus as defined in claim 3, wherein two such transmission mechanisms are provided each including a ring made of a plurality of transmission balls that support one of said driver balls, said transmission balls of both of said rings being in mutual contact at least during operation.

6. An apparatus as defined in claim 1; and further comprising a supporting mechanism arranged for supporting said driver balls in said bearing drilling and including supporting balls.

7. An apparatus as defined in claim 1; and further comprising a guide sleeve inserted in said bearing drilling and accommodating said driver balls.

8. An apparatus as defined in claim 3; and further comprising a guide sleeve inserted in said bearing drilling and accommodating said additional balls.

9. An apparatus as defined in claim 1; and further comprising a guide sleeve inserted in said bearing drilling and accommodating said supporting balls.

10. An apparatus as defined in claim 3; and further comprising a supporting mechanism arranged in said bearing drilling for supporting said driver balls and including supporting balls; and a guide sleeve for accommodating said driver balls, said additional balls and said supporting balls and located in said bearing drilling.

11. An apparatus as defined in claim 3, wherein said lifting element and said bearing body has additional guide grooves which extend in the direction of the lifting movement and supports said additional guide balls.

12. An apparatus as defined in claim 1, wherein said third wall section surrounds said second wall section and said first wall section surrounds said third wall section.

13. An apparatus as defined in claim 1, wherein said lifting element has a plunger which is guided and sealed within a closed chamber, said chamber having a wall that incorporates at least one port.

14. An apparatus as defined in claim 13, wherein said first and said second wall sections, said plunger, said bearing body and said rotary element define a closed chamber, said first wall section incorporating at least one port.

15. An apparatus as defined in claim 1, and formed as a pump; and further comprising a wall which has at least one inlet and one outlet port; and a controller plate associated with said wall and coupled with said rotary element, said controller plate having formations that either cover or uncover said inlet and said outlet ports selectively.

16. An apparatus as defined in claim 15, wherein said formations of said controller plate are formed as covers.

17. An apparatus as defined in claim 15, wherein said formations of said controller plate are formed as ports.

* * * * *